United States Patent
Kadu et al.

(10) Patent No.: US 12,177,459 B2
(45) Date of Patent: Dec. 24, 2024

(54) RATE-CONTROL-AWARE RESHAPING IN HDR IMAGING

(71) Applicant: Dolby Laboratories Licensing Corporation, San Francisco, CA (US)

(72) Inventors: Harshad Kadu, Santa Clara, CA (US); Ji Qi, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 229 days.

(21) Appl. No.: 17/780,895

(22) PCT Filed: Nov. 25, 2020

(86) PCT No.: PCT/US2020/062430
§ 371 (c)(1),
(2) Date: May 27, 2022

(87) PCT Pub. No.: WO2021/108719
PCT Pub. Date: Jun. 3, 2021

(65) Prior Publication Data
US 2023/0039038 A1   Feb. 9, 2023

Related U.S. Application Data

(60) Provisional application No. 62/940,942, filed on Nov. 27, 2019.

(30) Foreign Application Priority Data

Nov. 27, 2019 (EP) ..................... 19211730

(51) Int. Cl.
G06T 5/90 (2024.01)
H04N 19/146 (2014.01)
H04N 19/186 (2014.01)

(52) U.S. Cl.
CPC ......... *H04N 19/186* (2014.11); *H04N 19/146* (2014.11)

(58) Field of Classification Search
CPC ..... H04N 19/186; H04N 19/146; H04N 19/46
See application file for complete search history.

(56) References Cited

U.S. PATENT DOCUMENTS 8,208,560 B2 * 6/2012 Chiu ...................... H04N 19/34
382/238
10,032,262 B2 * 7/2018 Kheradmand ............ G06T 7/90
(Continued)

FOREIGN PATENT DOCUMENTS

CN 107409221 A 11/2017
CN 107771392 A 3/2018
(Continued)

OTHER PUBLICATIONS

Itu-R BT.2020-2 Parameter values for ultra-high definition television systems for production and international programme exchange Oct. 2015.
(Continued)

*Primary Examiner* — Philip P. Dang

(57) ABSTRACT

Given an input image in a high dynamic range (HDR) which is mapped to a second image in a second dynamic range using a reshaping function, to improve coding efficiency, a reshaping function generator may adjust the codeword range of the HDR input under certain criteria, such as for noisy HDR images with a relatively-small codeword range. An example of generating a scaler for adjusting the HDR codeword range based on the original codeword range and a metric of the percentage of edge-points in the HDR image is provided. The adjusted reshaping function allows for more efficient rate control during the compression of reshaped images.

13 Claims, 8 Drawing Sheets

(56) References Cited

U.S. PATENT DOCUMENTS

| | | | |
|---|---|---|---|
| 10,080,026 B2 | 9/2018 | Su | |
| 10,397,576 B2 * | 8/2019 | Kadu | H04N 9/67 |
| 10,397,586 B2 * | 8/2019 | Su | H04N 19/14 |
| 10,609,395 B2 * | 3/2020 | Kerofsky | H04N 19/157 |
| 10,645,403 B2 | 5/2020 | Song | |
| 10,701,359 B2 * | 6/2020 | Su | H04N 19/186 |
| 10,701,375 B2 * | 6/2020 | Su | H04N 19/102 |
| 10,701,404 B2 * | 6/2020 | Song | H04N 19/60 |
| 10,873,764 B2 * | 12/2020 | Hiron | H04N 19/186 |
| 11,277,610 B2 * | 3/2022 | Minoo | H04N 19/186 |
| 11,395,009 B2 * | 7/2022 | Yin | H04N 19/85 |
| 2009/0097561 A1 | 4/2009 | Chiu | |
| 2014/0247869 A1 * | 9/2014 | Su | H04N 19/30 |
| | | | 375/240.03 |
| 2017/0034520 A1 | 2/2017 | Rosewarne | |
| 2017/0221189 A1 * | 8/2017 | Kheradmand | G06T 5/92 |
| 2019/0124367 A1 * | 4/2019 | Lu | H04N 19/46 |
| 2019/0281325 A1 | 9/2019 | Song | |

FOREIGN PATENT DOCUMENTS

| | | |
|---|---|---|
| CN | 109155853 A | 1/2019 |
| JP | 2019506817 A | 3/2019 |
| WO | 2019160986 | 8/2019 |

OTHER PUBLICATIONS

ITU-R BT.709-6 "Parameter Values for the HDTV Standards for Production and International Programme Exchange" Jun. 2015. BT Series.

ITU-R, bt.2100-0-, "Image parameter values for high dynamic range television for use in production and international programme exchange" Jul. 2016.

Minoo, K. et al."Description of the Reshaper Parameters Derivation Process in ETM reference Software" JCT-VC Meeting, Feb. 2016, pp. 3-11.

Wikipedia Sobel Operator.

SMPTE ST 2084:2014 "High Dynamic Range Electro-Optical Transfer Function of Mastering Reference Displays".

* cited by examiner

RATE-CONTROL-AWARE RESHAPING IN HDR IMAGING

CROSS-REFERENCE TO RELATED APPLICATIONS

This application claims the benefit of priority from U.S. Provisional patent application 62/940,942, filed on 27 Nov. 2019, and EP patent application 19211730.7, filed on 27 Nov. 2019, each of which is hereby incorporated by reference.

TECHNOLOGY

The present disclosure relates generally to images. More particularly, an embodiment of the present invention relates to improving coding efficiency of high-dynamic range (HDR) images reconstructed from standard-dynamic range (SDR) images using reshaping functions.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma, PQ, HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

As used herein, the term "rate control" refers to adjusting quantization during image and video compression to achieve specific goals related to the overall bit rate and/or image quality of the coded bitstream. Traditional reshaping techniques are independent of the rate-control mechanisms within a video codec. As appreciated by the inventors here, improved techniques for rate-control-aware reshaping to reduce coding artifacts in HDR coding are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Designing rate-control-aware reshaping functions for coding HDR images and video content is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to designing rate-control-aware reshaping functions for the efficient coding of HDR images. In an embodiment, in an apparatus comprising one or more processors, a processor receives one or more input images in a first dynamic range (e.g., a high-dynamic range), it computes a first codeword range for luma pixels in the one or more input images, it computes a noise metric for the luma pixels in the one or more input images, it computes a scaler to adjust the first codeword range based on the first codeword range and the noise metric, and if the scaler is bigger than one, then a) it generates a second codeword range for the luma pixels in the one or more input images based on the scaler and the first codeword range, wherein the second codeword range is larger than the first codeword range, and b) it generates a forward luma reshaping function mapping luma pixel values from the first dynamic range to a second dynamic range (e.g., a standard dynamic range) based on the second codeword range; else it generates the forward luma reshaping function based on the first codeword range.

Example HDR Coding System

Figure 1A:
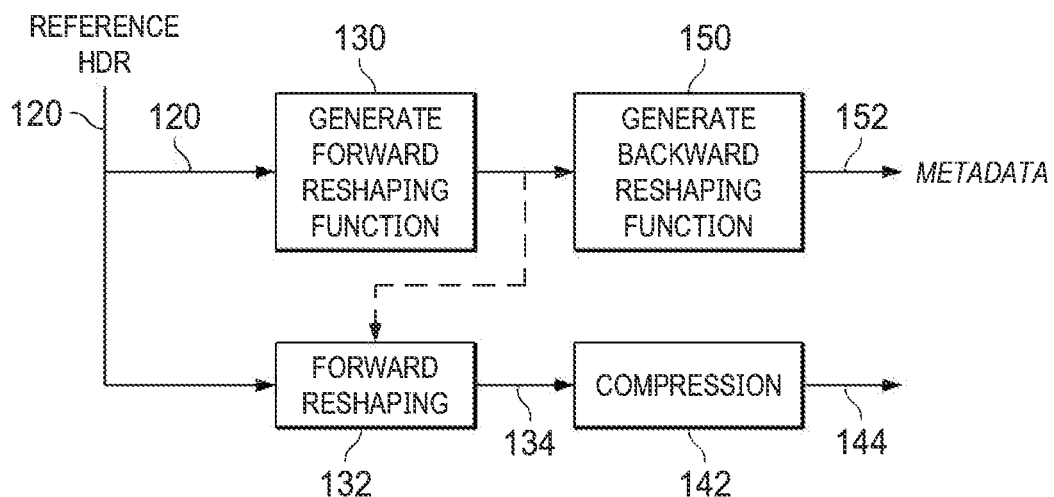
FIG. 1A depicts an example single-layer encoder for HDR data using a reshaping function according to prior art.
Figure 1B:
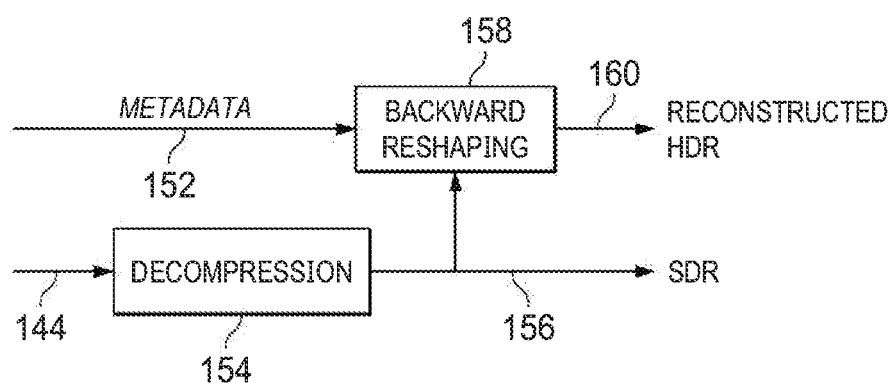
FIG. 1B depicts an example HDR decoder corresponding to the encoder of FIG. 1A, according to prior art.

As described in U.S. Pat. No. 10,032,262, "Block-based content-adaptive reshaping for high dynamic range images," by A. Kheradmand et al., to be referred to as the '262 patent, which is incorporated herein by reference in its entirety, FIG. 1A and FIG. 1B illustrate an example single-layer backward-compatible codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, given reference HDR content (120), corresponding SDR content (134) (also to be referred as base-layer (BL) or reshaped content) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward-reshaping metadata (152) is also encoded and transmitted in the video signal with the SDR content so that HDR display devices can reconstruct HDR content based on the SDR content and the backward reshaping metadata. Without loss of generality, in some embodiments, as in non-backward-compatible systems, SDR content may not be watchable on its own, but must be watched in combination with the backward reshaping function which will generate watchable SDR or HDR content. In other embodiments which support backward compatibility, legacy SDR decoders can still playback the received SDR content without employing the backward reshaping function.

As illustrated in FIG. 1A, given HDR image (120) and a target dynamic range, after generating, in step 130, a forward reshaping function (132); given the forward reshaping function, a forward reshaping mapping step (132) is applied to the HDR images (120) to generate reshaped SDR base layer (134). A compression block (142) (e.g., an encoder implemented according to any known video coding algorithms, like AVC, HEVC, AV1, and the like) compresses/encodes the SDR images (134) in a single layer (144) of a video signal. In addition, a backward reshaping function generator (150) may generate a backward reshaping function which may be transmitted to a decoder as metadata (152). In some embodiments, metadata (152) may represent the forward reshaping function (130), thus, it would be up to the decoder to generate the backward reshaping function (not shown).

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques, for example, and without limitation, as described in the '262 patent.

The backward reshaping metadata (152), as generated by the backward reshaping function generator (150) based on the SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the SDR images in the single layer (144) and the backward reshaping metadata (152) as a part of the overall image metadata are received as input on the decoder side of the codec framework. A decompression block (154) decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. In a backward-compatible system, the decoded SDR images (156) may be outputted in an output SDR video signal (e.g., over an HDMI interface, over a video link, etc.) to be rendered on an SDR display device.

Optionally, alternatively, or in addition, in the same or another embodiment, a backward reshaping block 158 extracts the backward (or forward) reshaping metadata (152) from the input video signal, constructs the backward reshaping functions based on the reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Rate-Control-Aware Reshaping

Rate control is an integral part of any video compression pipeline. The principle behind rate control is to adjust how much a picture is quantized to achieve a target bit rate. In general, more bits per frame corresponds to a better visual quality; however, allocating more bits per frame comes at the cost of increased bandwidth. Rate control tries to find a balance between a target bit rate and acceptable quality.

For example, under most rate-control schemes, pictures with complex textures are deemed visually significant and are allocated more bits during quantization; however, noisy images with perceptually irrelevant content may also exhibit complex textures and may end up being allocated more bits than necessary. Being allocated more bits for perceptually irrelevant content corresponds to allocating less bits for real content, which is highly inefficient and may even result in lower overall visual quality.

As depicted in FIG. 1A, in some embodiments, generating a reshaping function (e.g., block 130) may be completely independent and unaware of the rate-control optimization in the underlying encoder (142). As a result, some dark scenes that are barely visible to the naked eye, but contain high frequency noise, may consume a lot of bits, and scenes with smaller HDR codeword range may be mapped to a wider codeword range in the base layer and use up significant number of bits. To improve bit allocation, a new reshaping technique is proposed which adjusts the original reshaping based on the expected rate-control mechanism, thus providing higher quality images.

Image Reshaping

During reshaping each channel or color component of a HDR frame is mapped, separately, to the base layer (134). Mapping of HDR channels to base layer is commonly referred to as forward reshaping. For example, the luma channel in HDR is mapped to the base layer luma channel using a luma forward reshaping curve. The chroma channels in the HDR are separately mapped to the base layer chroma channels using their respective forward chroma reshaping curves. To achieve the highest visual quality, the base layer is designed to occupy most of the base layer codeword range; however, under certain conditions, (e.g., for noisy HDR content with a small codeword range), there is no need to span the entire base layer codeword range as it hardly improves the visual quality. Instead, the bit rate can be lowered by restricting the small codeword range HDR content to a smaller codeword range in the base layer.

Let the luma channel forward reshaping function to be denoted by $f_L$, such that, it maps HDR luma values $v_L$ to base layer luma values $s_L$ i.e. $s_L = f_L(v_L)$. In an embodiment, without limitation, the function may be monotonically non-decreasing.

As used herein, the terms "scene" or "group of pictures" refer to a set of consecutive frames in a video sequence with similar color or dynamic range characteristics. While example embodiments may refer to a scene, a forward reshaping function and/or a corresponding backward reshaping function as described herein may be constructed with similar methods for one of: a single image, a single group of pictures, a scene, a time window within a single scene or a single media program, etc.

Let the minimum and maximum HDR luma values in the i-th scene be given by $v_{L,min}^i$ and $v_{L,max}^i$ respectively. To generate a base layer of bit depth $B_s$, the function $f_L$ typically tries to map the minimum HDR luma value $v_{L,min}^i$ to zero (or other legal minimum value) and the maximum HDR luma value $v_{L,max}^i$ to the largest base layer codeword $2^{B_s}-1$ (or other legal maximum codeword value). Thus, let $$f_L(v_{L,min}^i) = s_{L,min}^i = 0$$

$$f_L(v_{L,max}^i) = s_{L,max}^i = 2^{B_s}-1. \quad (1)$$

The HDR codewords in the range $[v_{L,min}^i, v_{L,max}^i]$ are mapped to base layer luma codewords in the range $[0, 2^{B_s}-1]$. This gives the codeword range of base layer luma codewords $r_L^i$ as, $$r_L^i = s_{L,max}^i - s_{L,min}^i = 2^{B_s}-1. \quad (2)$$

Irrespective of the codeword range of HDR codewords, typically, the base layer spans the entire allowed codeword range.

For chroma channels, the mapping is slightly different. Suppose $f_{C0}$ and $f_{C1}$ be the functions for forward mapping of the C0 and C1 channels respectively (e.g., Cb and Cr in a YCbCr representation). These functions should also be monotonically non-decreasing. In an embodiment, the range of base layer chroma codewords $r_{Cx}^i$ is calculated using the following logic. As the procedure is same for both C0 and C1, the chroma-related subscripts are replaced by Cx.

$$r_{Cx}^i = K_{Cx} \times (s_{L,max}^i - s_{L,min}^i) \times \frac{v_{Cx,max}^i - v_{Cx,min}^i}{v_{L,max}^i - v_{L,min}^i}, \quad (3)$$

where $K_{C0}$ and $K_{C1}$ are constants smaller or equal to 1.0 and depend on the color space (e.g., set to default values of 0.5 for the IPTPQc2 color space, a variant of the ICtCp color space). The chroma forward reshaping functions $f_{C0}$ and $f_{C1}$ are independent of luma, but the range of the chroma codewords is still governed by the minimum and maximum luma values. After the codeword ranges are computed, the minimum and maximum of the base layer Cx channel codewords is, $$f_{Cx}(v_{Cx,min}^i) = s_{Cx,min}^i = \text{round}\left(2^{B_s - 1} - \frac{r_{Cx}^i}{2}\right), \quad (4)$$

$$f_{Cx}(v_{Cx,max}^i) = s_{Cx,max}^i = \text{round}\left(2^{B_s - 1} + \frac{r_{Cx}^i}{2}\right).$$

The HDR Cx channel codewords in the range $[v_{Cx,min}^i, v_{Cx,max}^i]$ are mapped to the base layer Cx channel codewords range $[s_{Cx,min}^i, s_{Cx,max}^i]$. In an embodiment, the function mapping HDR Cx channel codewords to the base layer codewords may be given by:

$$f_{Cx}(v_{Cx}^i) = s_{Cx}^i = \frac{s_{Cx,max}^i - s_{Cx,min}^i}{v_{Cx,max}^i - v_{Cx,min}^i} \times (v_{Cx}^i - v_{Cx,min}^i) + s_{Cx,min}^i, \quad (5)$$

where the symbols $v_{Cx}^i$ and $s_{Cx}^i$, respectively, represent any HDR or base layer codeword value.

Codeword-Range Adjustment for Improved Rate Control

Reshaping functions try to map HDR codewords to a range of base layer codewords. A wider range of codewords in the base layer is good to maintain high visual quality; however, in certain cases (e.g., for a noisy HDR signal with narrow codeword range) the number of bits required to compress such a base layer is far more significant than the visual quality improvement. A rate-control-aware reshaping scheme should help an encoder to intelligently allocate fewer bits to such HDR content, while the regular HDR content should pass through unchanged.

To design such a scheme, one will have to first detect HDR frames with such features, and then adjust (e.g., reduce) the base layer codeword range. Reducing the base layer codeword range will decrease the residuals during motion estimation. Smaller residuals reduce the magnitude of DCT coefficients, thus requiring fewer bits to encode after entropy coding.

In an embodiment, one way to decrease the base layer codeword range is by adjusting the perceived HDR codeword range, e.g., by artificially decreasing the minimum HDR value and/or increasing the maximum HDR value for the luma channel. Note that there is no change in the actual HDR image. One simply adjusts the computed minimum and maximum luma HDR values so that the forward luma reshaping curve is altered. These updated (adjusted or virtual) values are represented by $\tilde{v}_{L,min}^i$ and $\tilde{v}_{L,max}^i$ respectively, such that, $$\tilde{v}_{L,min}^i \leq v_{L,min}^i \text{ and } \tilde{v}_{L,max}^i \geq v_{L,max}^i. \quad (6)$$

For the luma channel, the updated forward reshaping function $\tilde{f}_L$ will map the virtual minimum and maximum values $\tilde{v}_{L,min}^i$ and $\tilde{v}_{L,max}^i$ to the base layer as:

$$\tilde{f}_L(\tilde{v}_{L,min}^i) = \tilde{s}_{L,min}^i = 0.$$

$$\tilde{f}_L(\tilde{v}_{L,max}^i) = \tilde{s}_{L,max}^i = 2^{B_s} - 1. \quad (7)$$

As $\tilde{f}_L$ is a monotonically non-decreasing function, the actual minimum and maximum values, i.e. $v_{L,min}^i$ and $v_{L,max}^i$, will map to different base layer codewords:

$$\tilde{f}_L(v_{L,min}^i) \geq 0,$$

$$\tilde{f}_L(v_{L,max}^i) \leq 2^{B_s} - 1. \quad (8)$$

With this updated luma forward reshaping curve, the mapped base layer luma codeword range will shrink, $\tilde{r}_L^i \leq r_L^i$, as:

$$\tilde{r}_L^i = \tilde{f}_L(v_{L,max}^i) - \tilde{f}_L(v_{L,min}^i) \leq 2^{B_s} - 1 = r_L^i. \quad (9)$$

In summary, decreasing the minimum and/or increasing the maximum HDR luma values will reduce the base layer luma codeword range and allow for more efficient rate control during the subsequent compression step.

For the chroma channels, the range of base layer codewords is dependent on the luma HDR minimum and maximum values. With the updated (virtual) values, the chroma base layer codeword ranges will also change as follows:

$$\tilde{r}_{Cx}^i = K_{Cx} \times (\tilde{s}_{L,max}^i - \tilde{s}_{L,min}^i) \times \frac{v_{Cx,max}^i - v_{Cx,min}^i}{\tilde{v}_{L,max}^i - \tilde{v}_{L,min}^i}. \quad (10)$$

As the updated denominator $\tilde{v}_{L,max}^i - \tilde{v}_{L,min}^i$ is larger, the codeword range reduces i.e. $\tilde{r}_{Cx}^i \leq r_{Cx}^i$. Note that the numerator of equation (10) is the same as before, as $\tilde{s}_{L,max}^i - \tilde{s}_{L,min}^i = s_{L,max}^i - s_{L,min}^i$. This will change the chroma base layer range $[\tilde{s}_{Cx,min}^i, \tilde{s}_{Cx,max}^i]$ as follows:

$$\tilde{f}_{Cx}(\tilde{v}_{Cx,min}^i) = \tilde{s}_{Cx,min}^i = \text{round}\left(2^{B_s - 1} - \frac{\tilde{r}_{Cx}^i}{2}\right), \quad (11)$$

$$\tilde{f}_{Cx}(\tilde{v}_{Cx,max}^i) = \tilde{s}_{Cx,max}^i = \text{round}\left(2^{B_s - 1} + \frac{\tilde{r}_{Cx}^i}{2}\right).$$

By generating virtual minimum and maximum HDR luma values, the range of luma and chroma base layer codewords can be made smaller than before. This change can help to reduce the bit rate. The amount by which these values should be changed is controlled by the strength of a base layer codeword range reduction parameter, to be denoted as M. Details on how to derive M are provided later on.

Figure 2A:
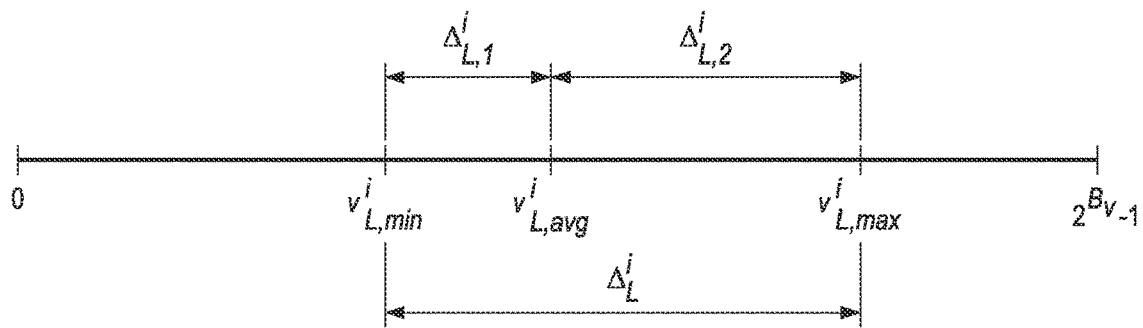
FIG. 2A depicts an example of parameters related to the actual HDR luma codeword range within a scene.

As discussed, by adjusting the minimum luma HDR value $v_{L,min}^i$ and the maximum luma HDR value $v_{L,max}^i$ one may reduce the codeword range of the base layer, thus effectively reducing the bit rate. As depicted in FIG. 2A, let $\Delta_{L,1}^i$ and $\Delta_{L,2}^i$ be such that, $$\Delta_{L,1}^i = v_{L,avg}^i - v_{L,min}^i,$$

$$\Delta_{L,2}^i = v_{L,max}^i - v_{L,avg}^i, \quad (12)$$

where, $v_{L,min}^i$, $v_{L,avg}^i$ and $v_{L,max}^i$ denote the minimum, average and maximum HDR luma value values for scene i. The difference between the minimum and maximum HDR luma values, denoted as $\Delta_L^i$ for scene i, can be derived as $$\Delta_L^i = v_{L,max}^i - v_{L,min}^i = (v_{L,max}^i - v_{L,avg}^i) + (v_{L,avg}^i - v_{L,min}^i) = \Delta_{L,1}^i + \Delta_{L,2}^i. \quad (13)$$

As an example, Table 1 shows in pseudo code an example algorithm for computing $\Delta_L^i$. A luma channel frame j in scene i is denoted by $F_{j,L}^i$ with width $W_L$ and height $H_L$. A specific pixel in this frame is represented by $F_{j,L}^i(m,n)$, where (m, n) is the location of the pixel. Let T be the total number of frames in the scene. Moreover, let $v_{j,L,min}^i$, $v_{j,L,avg}^i$ and $v_{j,L,max}^i$ be the minimum, average and maximum HDR luma values for frame j luma channel.

TABLE 1

Example pseudo code for computing $\Delta_L^i$

```
// Compute frame minimum, average and maximum
For j = 0 → T − 1
{
    v_{j,L,min}^i = F_{j,L}^i (0,0)
    v_{j,L,max}^i = F_{j,L}^i (0,0)
    v_{j,L,sum}^i = 0
    For m = 0 → H_L − 1
        For n = 0 → W_L − 1
            v_{j,L,sum}^i = v_{j,L,sum}^i + F_{j,L}^i (m, n)
            If v_{j,L,min}^i > F_{j,L}^i (m, n)
                v_{j,L,min}^i = F_{j,L}^i (m, n)
            If v_{j,L,max}^i < F_{j,L}^i (m, n)
                v_{j,L,max}^i = F_{j,L}^i (m, n)
    v_{j,L,avg}^i = v_{j,L,sum}^i /(W_L × H_L )
}
// Compute scene minimum, average and maximum
v_{L,min}^i = v_{0,L,min}^i
v_{L,max}^i = v_{0,L,max}^i
v_{L,sum}^i = 0
For j = 0 → T − 1
{
    v_{L,sum}^i = v_{L,sum}^i + v_{j,L,sum}^i
    If v_{L,min}^i > v_{j,L,min}^i
        v_{L,min}^i = v_{j,L,min}^i
    If v_{L,max}^i < v_{j,L,max}^i
        v_{L,max}^i = v_{j,L,max}^i
}
v_{L,avg}^i = v_{L,sum}^i / T
Δ_L^i = v_{L,max}^i − v_{L,min}^i
```

Computing Scaler M

In an embodiment, the value of base layer codeword range adaptation M is greater than or equal to 1. When M=1, rate-control-aware reshaping is not performed. For M>1, the minimum and maximum HDR luma values $v_{L,min}^i$ and $v_{L,max}^i$ are translated to the virtual $\tilde{v}_{L,min}^i$ and $\tilde{v}_{L,max}^i$ values as:

$$\tilde{v}_{L,min}^i = \max(0, v_{L,avg}^i - M \times \Delta_{L,1}^i), \quad (14a)$$

$$\tilde{v}_{L,max}^i = \min(2^{B_v} - 1, v_{L,avg}^i + M \times \Delta_{L,2}^i). \quad (14b)$$

Figure 2B:
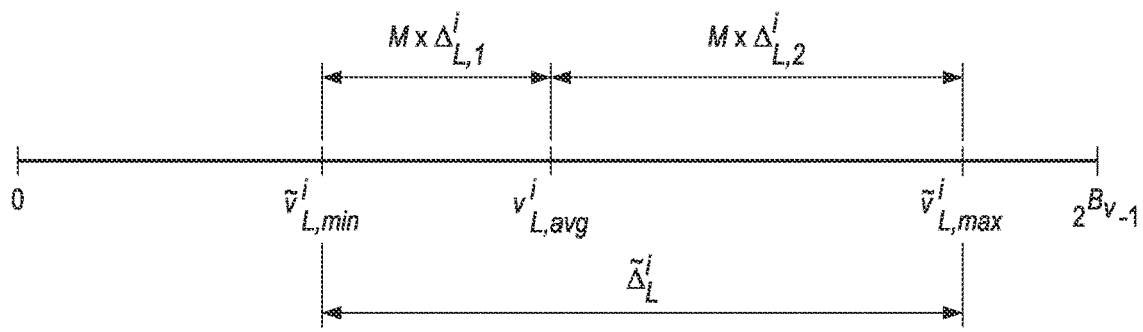
FIG. 2B depicts an example of parameters related to a virtual HDR luma codeword range, adjusted according to an embodiment of this invention.

In general, if M>1, as depicted in FIG. 2B, $\tilde{v}_{L,min}^i$ will decrease and $\tilde{v}_{L,max}^i$ will increase. This will decrease the updated base layer codeword range $\tilde{r}_L^i$ as $\tilde{f}_L$ is a monotonically non-decreasing function. As discussed earlier, the chroma base layer codeword range $\tilde{r}_{Cx}^i$ will also shrink more as the denominator $\tilde{v}_{L,max}^i - \tilde{v}_{L,min}^i$ increases, as explained. Thus, increasing M will reduce the bits required to encode this particular frame or scene, allowing more bits to be allocated in frames or scenes which truly require higher bit rate.

As depicted in equation (14), in a typical embodiment, M may be used to adjust both $v_{L,min}^i$ and $v_{L,max}^i$. In another embodiment, it may be desired to adjust only one of the two boundary values (e.g., to better preserve the highlights or the darks). Thus, one my leave $v_{L,min}^i$ unchanged and only adjust $v_{L,max}^i$ by using equation (14b), or one may leave $v_{L,max}^i$ unchanged and adjust $v_{L,min}^i$ by using equation (14a).

Figure 3:
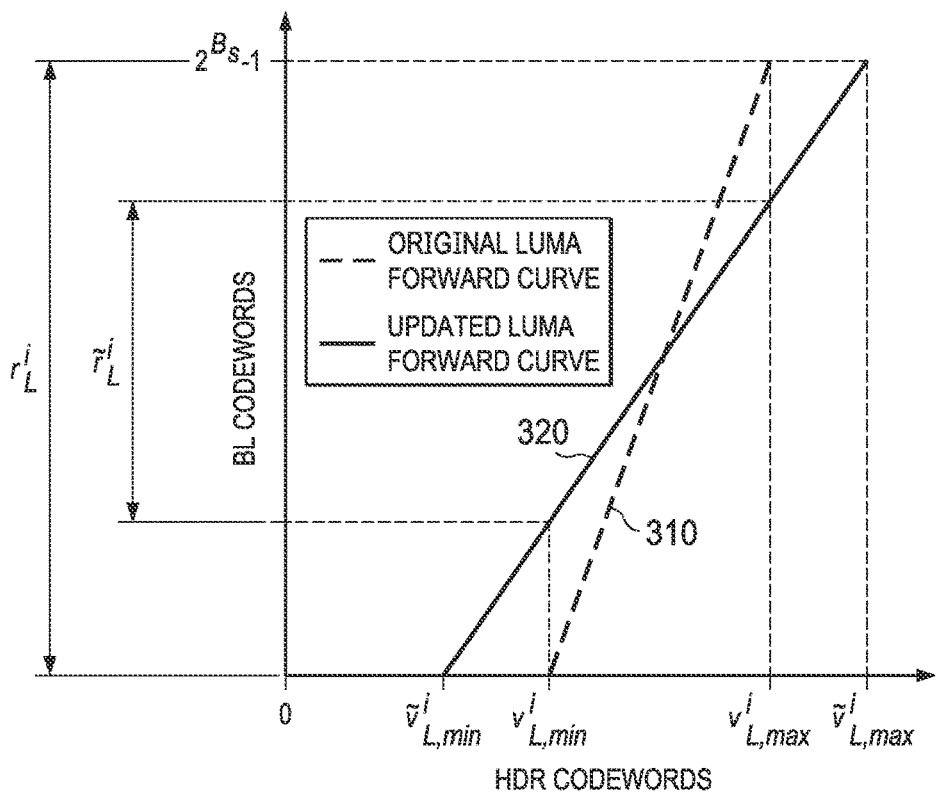
FIG. 3 depicts an example of a forward reshaping mapping as adjusted according to an embodiment of this invention.

FIG. 3 depicts an example of how adjusting the minimum and maximum HDR values affects the range of codewords in the base layer. The figure provides a very crude representation of a forward reshaping function to help explain the core concept. The graph in the figure is not drawn to scale. As the original luma forward reshaping mapping (310) gets updated to the adjusted mapping (320), the range of base layer codewords reduces from $r_L^i$ to $\tilde{r}_L^i$. The change is governed by the strength of the base layer reduction factor, i.e., M. Similar adjustments occur for the chroma mappings as well.

In equation (14), one adjusts $v_{L,min}^i$ and $v_{L,max}^i$ by multiplying $\Delta_{L,1}^i$ and $\Delta_{L,2}^i$ by M, and these changes implicitly affect the SDR codeword range. Note, that the exact same effect may be accomplished by directly narrowing the original SDR codeword range. For example, let $$\tilde{f}_L(v_{L,avg}^i) = s_{L,avg}^i. \quad (15)$$

Then, for an original SDR range [0, $2^{B_s}$), for M>1, the updated SDR codeword range may be computed as $$\tilde{s}_{L,min}^i = s_{L,avg}^i - s_{L,avg}^i/M,$$

$$\tilde{s}_{L,max}^i = s_{L,avg}^i + (2^{B_s} - 1 - s_{L,avg}^i)/M, \quad (16)$$

and $$\tilde{r}_L^i(\tilde{s}_{L,max}^i - \tilde{s}_{L,min}^i) \leq (2^{B_s} - 1) = r_L^i. \quad (17)$$

Criteria for Adjusting the HDR Codeword Range

Generating virtual HDR luma values will ensure that the base layer codeword ranges for luma and chroma channels will get reduced. This reduction will result in lower bitrate for encoding such a base layer; however, such an adjustment needs to be done only for select scenes. In an embodiment, without limitation, it is suggested that scenes having small HDR codeword range and high frequency, noise-like, content should be mapped to a smaller SDR codeword range. In such a case, a three-step algorithm is proposed:
1. Compute features for identifying noisy HDR content with relatively-small codeword range
2. Evaluate the strength of base layer codeword range reduction from the feature values
3. Construct modified forward reshaping curves and generate the base layer As before, discussions may refer to a scene; however, a scene can be any group of contiguous frames or even a single frame. Given the minimum, average, and maximum luminance values in a scene, in an embodiment, $\Delta_L^i$ (see equation (13)), may be used to identify whether the input HDR content has a small codeword range or not. For example, if $\Delta_L^i$ is smaller than a certain threshold (e.g., $Th_{HDR}$) then the scene can be classified as a scene with small HDR codeword range.

As known by a person skilled in the art, there exist a variety of algorithms to classify regions of a picture or a frame as "noisy." For example, one may compute block-based statistics, such as their mean, variance, and or standard deviation, and use these statistical data for classification. In an embodiment, without limitation, a metric of noisiness in the picture is derived based on the number of pixels in a frame classified as "edges." Details are provided next.

In order to detect noisy content, one may start by computing the total number of edge points in each luma and color channel of a frame. Let $I_{j,L}^i$, $I_{j,C0}^i$ and $I_{j,C1}^i$ denote the normalized luma and chroma channels of frame j in scene i i.e. $F_{j,L}^i$. Every pixel value in a normalized image is in the range [0, 1). Consider $B_v$ to be the bit-depth of the source HDR.

$$I_{j,L}^i(m,n) = F_{j,L}^i(m,n)/2^{B_v}, \text{ for all } m \in [0, H_L-1] \text{ and } n \in [0\ W_L-1],$$

$$I_{j,Cx}^i(m,n) = F_{j,Cx}^i(m,n)/2^{B_v}, \text{ for all } m \in [0, H_{Cx}-1] \text{ and } n \in [0, W_{Cx}-1]. \quad (18)$$

Let the height and width of the luma channel image be $H_L$, $W_L$ respectively, and let $H_{Cx}$, $W_{Cx}$ denote the height and width of chroma channels. In an embodiment, one may apply any known in the art edge-detection techniques (e.g., the Sobel operator and the like) to identify edges in the luma channel. For example, in an embodiment, the Sobel operators are given by $$\Psi_1 = \begin{bmatrix} -1 & 0 & 1 \\ -2 & 0 & 2 \\ -1 & 0 & 1 \end{bmatrix} \text{ and } \Psi_2 = \begin{bmatrix} -1 & -2 & -1 \\ 0 & 0 & 0 \\ 1 & 2 & 1 \end{bmatrix}.$$

Kernels $\Psi_1$ and $\Psi_2$ are used to evaluate horizontal and vertical gradient images $G_{1,j,L}^i$ and $G_{2,j,L}^i$ respectively, for the luma channel $$G_{1,j,L}^i = \Psi_1 \otimes I_{j,L}^i \text{ and } G_{2,j,L}^i = \Psi_2 \otimes I_{j,L}^i,$$

$$G_{j,L}^i = ((G_{1,j,L}^i)^2 + (G_{2,j,L}^i)^2)^{1/2}, \quad (19)$$

where the symbol $\otimes$ denotes a 2D convolution operator and $G_{j,L}^i$ is the luma gradient magnitude image. The gradient images for chroma channels are also evaluated.

$$G_{2,j,Cx}^i = \Psi_1 \otimes I_{j,Cx}^i \text{ and } G_{2,j,Cx}^i = \Psi_2 \otimes I_{j,Cx}^i,$$

$$G_{j,Cx}^i = ((G_{1,j,Cx}^i)^2 + (G_{2,j,Cx}^i)^2)^{1/2}. \quad (20)$$

After the gradient image is computed, the pixels having magnitude of gradients above a threshold $Th_j$ are designated as edge points. Choosing a fixed threshold may not be very reliable, thus, in embodiment, an adaptive threshold may be preferable, computed as follows:

$$\Delta_{j,L,1}^i = v_{j,L,avg}^j - v_{j,L,min}^j \quad (21)$$

$$\Delta_{j,L,2}^i = v_{j,L,max}^j - v_{j,L,avg}^j,$$

$$Th_j = \max\left(0.001, \min\left(\frac{\Delta_{j,L,1}^i}{2^{B_v}}, \frac{\Delta_{j,L,2}^i}{2^{B_v}}\right)\right),$$

where the value of the threshold is within the range [0.001, 1]. The constant 0.001 puts a lower bound on the threshold value, so it should not reduce to zero. Quantities $\Delta_{j,L,1}^i$ and $\Delta_{j,L,2}^i$ are intensity differences and roughly analogous to gradients. Taking the minimum of $$\left(\frac{\Delta_{j,L,1}^i}{2^{B_v}}, \frac{\Delta_{j,L,2}^i}{2^{B_v}}\right)$$

gives an estimate of the range of normalized pixel-wise differences within the image and provides a suitable threshold. Note that, the value of the threshold is determined by the luma values only; however, the same threshold is applied to both luma and chroma channel gradient images. Even though the threshold may change for each frame, it does not have a direct impact on temporal consistency of the entire algorithm.

For noisy images with small codeword range, $\Delta_{j,L,1}^i$ or $\Delta_{j,L,2}^i$ are small, so the threshold $Th_j$ is lower and more points are detected as edge points. On the contrary, normal images have higher values for $\Delta_{j,L,1}^i$ or $\Delta_{j,L,2}^i$, which increases the threshold and reduces the number of detected edge points.

Denote the percentage of edge pixels in the luma or chroma channels by $P_{j,L}^i$, $P_{j,C0}^i$ and $P_{j,C1}^i$ respectively. For each pixel in the gradient image, if the value is greater than or equal to the threshold $Th_j$, it is regarded as an edge pixel. Suppose $\Xi$ is the identity function, $$P_{j,L}^i = \frac{\sum_{m,n} \Theta(G_{j,L}^i(m,n) \geq Th_j)}{W_L \times H_L} \times 100, \quad (22)$$

$$P_{j,Cx}^i = \frac{\sum_{m,n} \Theta(G_{j,Cx}^i(m,n) \geq Th_j)}{W_{Cx} \times H_{Cx}} \times 100.$$

Let $P_j^i$ be the maximum value among all the three channels of that frame and $P^i$ be the maximum of all the frames in the scene.

$$P_j^i = \max(P_{j,L}^i, P_{j,C0}^i, P_{j,C1}^i),$$

$$P^i = \max(P_j^i), j = 0, 1, 2, \ldots T-1. \quad (23)$$

Table 2 provides an example algorithm to compute the edge-point percentage in a frame using equations (19) to (23). In general, the percentage of edge pixels is a relevant feature for detecting high frequency noise. Noisy images have textures with pixels having drastically different intensities juxtaposed together. Gradients are generally high in those regions and density of edge pixels is high. On the contrary, smooth images have fewer edge pixels and lower percentage of edge pixels. Thus, one may combine the HDR luma intensity codeword range and edge point percentage features to compute the strength of base layer codeword range reduction M.

TABLE 2

Example algorithm to compute edge-point percentage in a frame

```
// Compute threshold for each frame
For j = 0 → T − 1
{
    Δ_{j,L,1}^i = v_{j,L,avg}^i − v_{j,L,min}^i
    Δ_{j,L,2}^i = v_{j,L,max}^i − v_{j,L,avg}^i
    Th_j = max(0.001, min(Δ^1_{j,L,1}/2^{B_v}, Δ^1_{j,L,2}/2^{B_v}))
    // Luma channel
    G_{1,j,L}^i = Ψ_1 ⊕ I_{j,L}^i
    G_{2,j,L}^i = Ψ_2 ⊕ I_{j,L}^i
    G_{j,L}^i = ((G_{1,j,L}^i)^2 + (G_{2,j,L}^i)^2)^{1/2}
    P_{j,L}^i = 0
    For m = 0 → H_L − 1
        For n = 0 → W_L − 1
            If G_{j,L}^i(m,n) ≥ Th_j
                P_{j,L}^i = P_{j,L}^i + 1
    P_{j,L}^i = P_{j,L}^i / (W_L × H_L) × 100
    // Chroma channels for x = 0 and x = 1
```

TABLE 2-continued

Example algorithm to compute edge-point percentage in a frame $G_{1,j,Cx}^{i} = \Psi_1 \oplus I_{j,Cx}^{i}$
$G_{2,j,Cx}^{i} = \Psi_2 \oplus I_{j,Cx}^{i}$
$G_{j,Cx}^{i} = \left((G_{1,j,Cx}^{i})^2 + (G_{2,j,Cx}^{i})^2\right)^{1/2}$
$P_{j,Cx}^{i} = 0$
For m = 0 → $H_{Cx}$ − 1
  For n = 0 → $W_{Cx}$ − 1
    If $G_{j,Cx}^{i}(m,n) \geq Th_j$
      $P_{j,Cx}^{i} = P_{j,Cx}^{i} + 1$
$P_{j,Cx}^{i} = \frac{P_{j,Cx}^{i}}{W_{Cx} \times H_{Cx}} \times 100$
$P_{j}^{i} = \max(P_{j,L}^{i}, P_{j,C0}^{i}, P_{j,C1}^{i})$
}
$P^{i} = P_{0}^{i}$
For j = 1 → T − 1
{
  If $P^{i} < P_{j}^{i}$
    $P^{i} = P_{j}^{i}$
}

Example of an M-Adaptation Scheme

As described earlier, one may use hard thresholds (e.g., $Th_{HDR}$) on the feature values to determine if a certain HDR scene is noisy or has a small codeword range. One potential problem with hard thresholds is temporal inconsistency. For example, there can be a scenario where scene characteristics trigger rate-control-aware reshaping; however, the very next scene is processed with normal reshaping. This scenario will create temporal inconsistencies and potential visual quality problems, especially when each scene has only one frame. To avoid these problems, a novel technique without such hard thresholds is proposed.

In an embodiment, instead of a binary (e.g., yes/no) classification of a scene as noisy with a small codeword range, one may use the feature values to modulate the strength of the base layer range reduction M. If the feature values strongly indicate that rate-control-aware reshaping is needed, then a larger M value is applied. On the contrary, if feature values are weak indicators that rate-control-aware reshaping is needed, then a smaller M is employed. By applying the feature values to compute M, there is no need to explicitly classify each scene as noisy with a small codeword range. Details of the proposed approach are explained next.

Let $\delta$ and $\beta$ denote parameters that control the strength of base layer range reduction M. These parameters are dependent on feature values. Normalized HDR luma range $\delta$ is a fraction in the range [0, 1) and, in an embodiment, its value may depend on the range of HDR luma codewords in the scene, i.e., $\Delta_L^{i}$, as:

$$\delta = \frac{\Delta_L^{i}}{2^{B_v}}. \tag{24}$$

In an embodiment, the rational number $\beta$ is computed based on the edge-point percentage of that scene, i.e., $P^{i}$, as:

$$\beta = \min\left(\max\left(\frac{1}{P^{i}}, P^{i}\right), 100\right) P^{i} > 0. \tag{25}$$

For $P^{i}=0$, $\beta=1$. The value of $\beta$ varies in [1.0, 100.0] as $P_i \in (0, 100.0]$. The reason for choosing $\max(1/P^{i}, P^{i})$ to calculate $\beta$ is the following. Feature value $P^{i}$ will be large for noisy scenes and $1/P^{i}$ will be large for mostly flat (no spatial variations) scenes. In both the cases, it is desired to have a higher $\beta$ and stronger base layer codeword range reduction.

Given these two parameters, in an embodiment, the strength of base layer codeword range reduction M may be computed using an exponential mapping, as in $$M = \max(\beta e^{-\alpha\delta}, 1.0). \tag{26}$$

The curve $\beta e^{-\alpha\delta}$ is monotonically decreasing. Let C (e.g., C=0.15) denote a constant as a function of the normalized cutoff HDR luma codeword range. For example, let $\delta \geq C$ denote the range where rate-control-aware reshaping should not be triggered. In other words, M=1 when $\delta=C$ and thereafter. Substituting the values $\delta=C$ and M=1 in equation (26), one can compute the value of a as $$M = 1 = \beta e^{-\alpha C},$$

which implies $$\alpha = \frac{-\ln(1/\beta)}{C}, \tag{27}$$

or $$\alpha = \frac{\ln(\beta)}{C}.$$

Figure 4A:
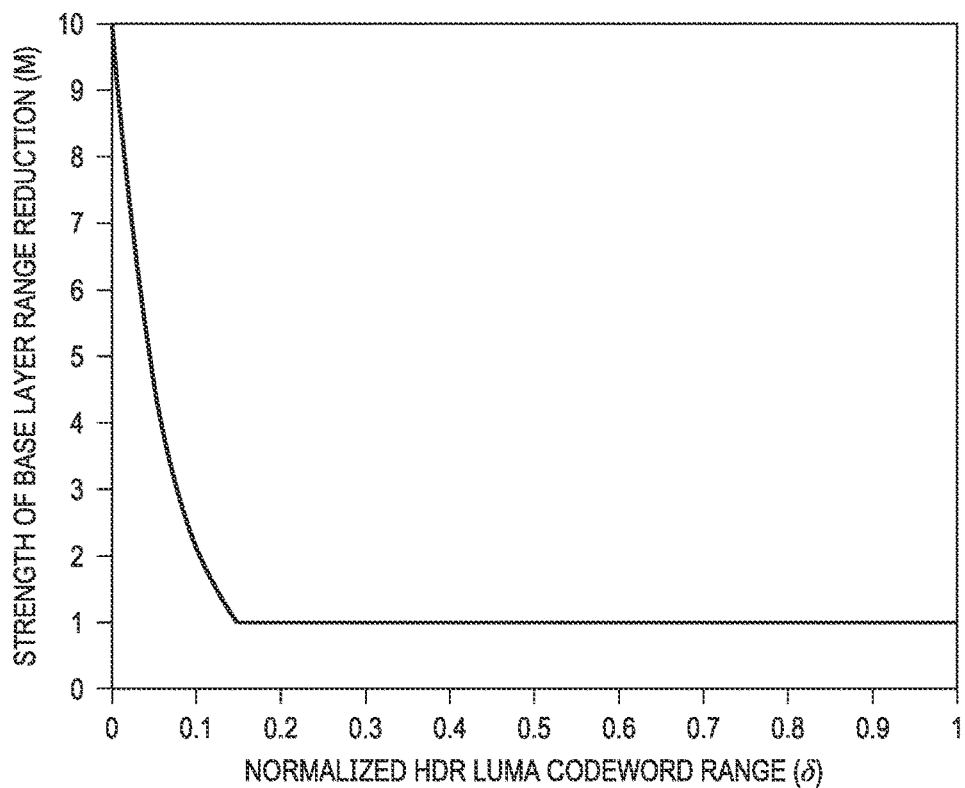
FIG. 4A and FIG. 4B depict example curves for an adaptation parameter (M) according to embodiments of this invention.

FIG. 4A depicts the plot for M vs for $\delta \in [0,1)$ and $\beta=10$. As seen in the plot, M=$\beta$ at $\delta=0$ and rapidly decreases to M=1 for $\delta=C=0.15$. The constant C=0.15 acts as a cutoff, so any scene with $\delta \geq C$ does not go through rate-control-aware reshaping. The algorithm is triggered only for scenes with $\delta < C$.

Figure 4B:
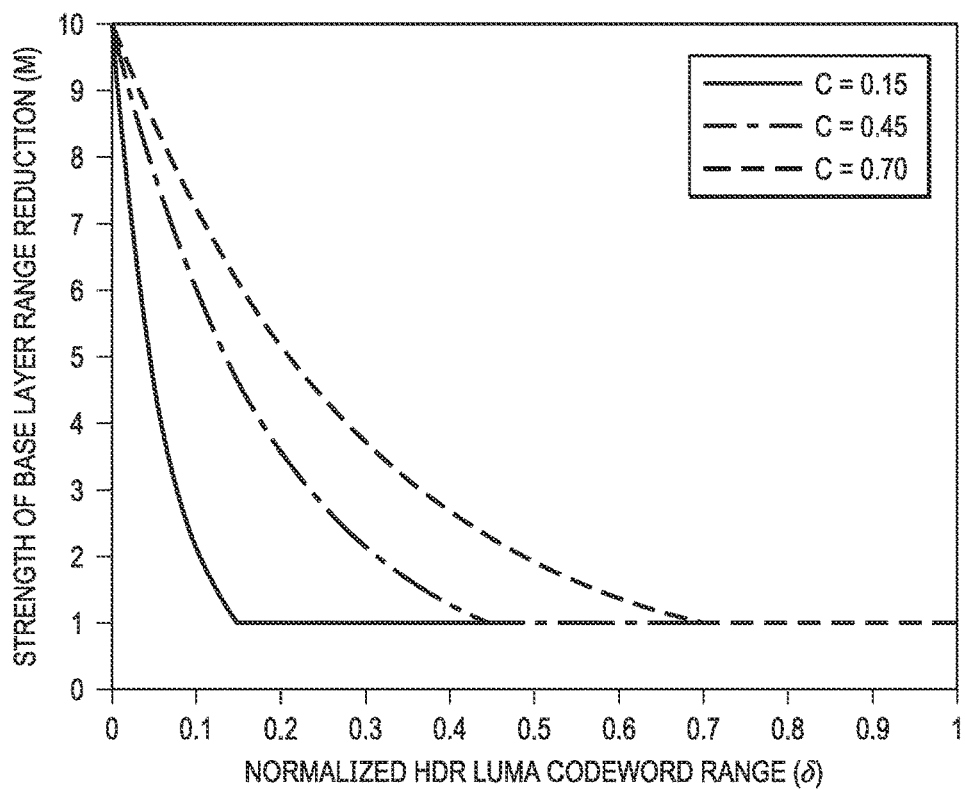

FIG. 4B depicts additional examples of plotting of M vs $\delta$ for values of C=0.15, 0.45, and 0.70. The cutoff point changes with C. In an embodiment the value of constant C may be adjusted through a customizable configuration file with a default set to 0.15. As scene HDR luminance codeword range $\Delta_L^{i}$ decreases (small range), $\delta$ decreases, M increases and codeword range reduction is stronger. After computing M from the feature values, the minimum and maximum luma HDR values are updated as discussed earlier (see equation (14)). Table 3 provides in pseudocode an example implementation of equations (21), (22), (24), and (14) to generate the virtual HDR min and max codeword boundaries.

In Table 3, as described earlier (see equations (15)-(17)), following "if M>1," instead of increasing the HDR codeword range, in an alternative embodiment, one could also directly decrease the SDR codeword range.

TABLE 3

Example M-adaptation algorithm

// Compute parameters $\delta$ and $\beta$ from feature values $\delta = \frac{\Delta_L^{i}}{2^{B_v}}$ $\beta = \min\left(\max\left(\frac{1}{P^{i}}, P^{i}\right), 100\right)$

C = 0.15

TABLE 3-continued

Example M-adaptation algorithm $$\alpha = \frac{\ln(\beta)}{C}$$

// Compute M from the parameters
M = max($\beta e^{-\alpha\delta}$, 1.0)
// Update the minimum and maximum HDR luma values
if M > 1
    $\tilde{v}_{L,min}^{i}$ = max(0, $v_{L,avg}^{i}$ −M×$\Delta_{L,1}^{i}$)
    $\tilde{v}_{L,max}^{i}$ = min($2^{Bv}$ −1, $v_{L,avg}^{i}$ +M×$\Delta_{L,2}^{i}$)
else // no change
    $\tilde{v}_{L,min}^{i}$ = $v_{L,min}^{i}$
    $\tilde{v}_{L,max}^{i}$ = $v_{L,max}^{i}$ Modifying the Forward Reshaping Mapping Given the adjusted minimum and maximum HDR luma values $\tilde{v}_{L,min}^{i}$ and $\tilde{v}_{L,max}^{i}$, the luma and chroma forward reshaping curves are computed using known in the art techniques (e.g., as in the "262 patent) using virtual $\tilde{v}_{L,min}^{i}$ and $\tilde{v}_{L,max}^{i}$ as the minimum and maximum HDR luma values. In an embodiment, values outside the index range [$v_{L,min}^{i}$, $v_{L,max}^{i}$] are extrapolated by copying from the closest valid entry. In other words, all the entries in the index range [$\tilde{v}_{L,min}^{i}$, $v_{L,min}^{i}$) get the same value as the value at index $v_{L,min}^{i}$. Similarly, the codewords in the index range ($v_{L,max}^{i}$, $\tilde{v}_{L,max}^{i}$] get the value as the value at index $v_{L,max}^{i}$. The unused codewords are assigned using the power curve that spans the same codeword range [$\tilde{v}_{L,min}^{i}$, $\tilde{v}_{L,max}^{i}$]. As a result, the Forward LUT also maps the [$\tilde{v}_{L,min}^{i}$, $\tilde{v}_{L,max}^{i}$] HDR luma codeword range to the SDR codeword range [0,$2^{B_s}$−1]. The chroma forward reshaping curves are also altered due to $\tilde{v}_{L,min}^{i}$, $\tilde{v}_{L,max}^{i}$, for example, see equations (4) and (5).

Figure 5:
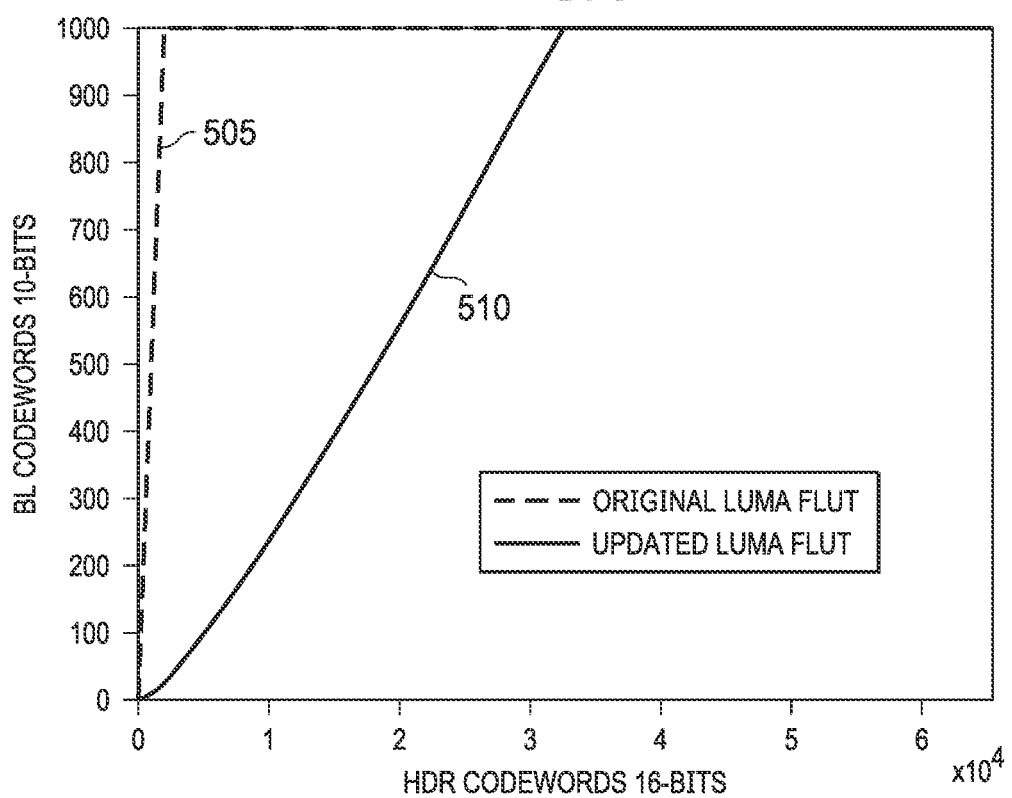
FIG. 5 depicts a second example of forward reshaping mapping as adjusted according to an embodiment of this invention.

FIG. 5 depicts an example of an original luma forward reshaping mapping (505) as modified to generate the adjusted luma forward reshaping mapping (510) according to an embodiment. In the original mapping, in a noisy HDR input, the 16-bit HDR values between 0 to ~2K are mapped to the entire 10-bit BL codeword range [0, 1023]. This leads to a rather inefficient coding. Using the adjusted reshaping mapping (510), the input HDR values are mapped only within the BL codeword range [0, 23], allowing a more efficient compression by the encoder (142).

Figure 6:
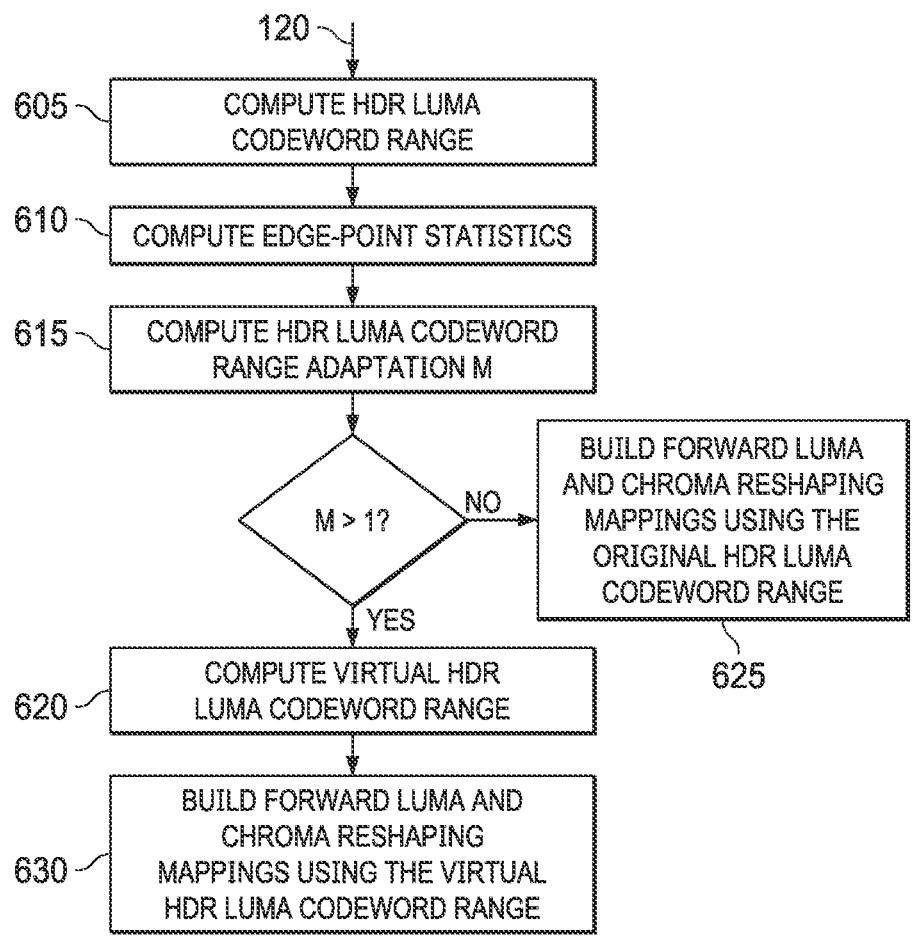
FIG. 6 depicts an example process for rate-control-aware reshaping according to an embodiment of this invention.

FIG. 6 depicts an example process for generating rate-control-aware forward reshaping functions according to an embodiment. As depicted in FIG. 6, given an HDR input (120), in steps 605 and 610 one computes appropriate features to detect whether the input data can be classified as worthy of being adjusted for rate-control aware reshaping (e.g., noisy HDR data with small codeword range $\Delta_L^{i}$). For example, in step 605, one may apply the algorithm in Table 1 to compute the HDR luma codeword range $\Delta_L^{i}$ and then apply equation (24) to compute parameter $\delta$. In step 610 one may apply the algorithm in Table 2 to compute using an edge operator the edge-point percentage metric $P^i$ and the corresponding metric $\beta$ (see equation (25)). Given these parameters, in step 615 one computes the luma-codeword range adaptation metric M (see for example algorithm in Table 3). If M=1, there is no need to make any adjustments, and step 625 (e.g., a processing block within block 130) will generate the forward reshaping functions as before using the computed HDR codeword range in step 610. If M>1, then, as depicted in Table 3, in step 620, one needs to compute the adjusted or virtual HDR luma codeword range and use it in step 630 to compute the forward luma and chroma reshaping functions.

The discussion herein assumed out-of-loop reshaping, wherein forward and backward reshaping is performed outside of compression and decompression; however, similar techniques for HDR codeword-range adaptation may also be applicable to in-loop reshaping schemes, such as those presented in PCT Application Ser. No. PCT/US2019/017891, "Image reshaping in video coding using rate distortion optimization," by P. Yin et al., filed on Feb. 13, 2019, which is incorporated herein by reference.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to generating rate-control-aware reshaping functions, such as those described herein. The computer and/or IC may compute, any of a variety of parameters or values that relate to rate-control-aware reshaping functions as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for rate-control-aware reshaping functions as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to rate-control-aware reshaping functions for HDR images are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Figure 7A:
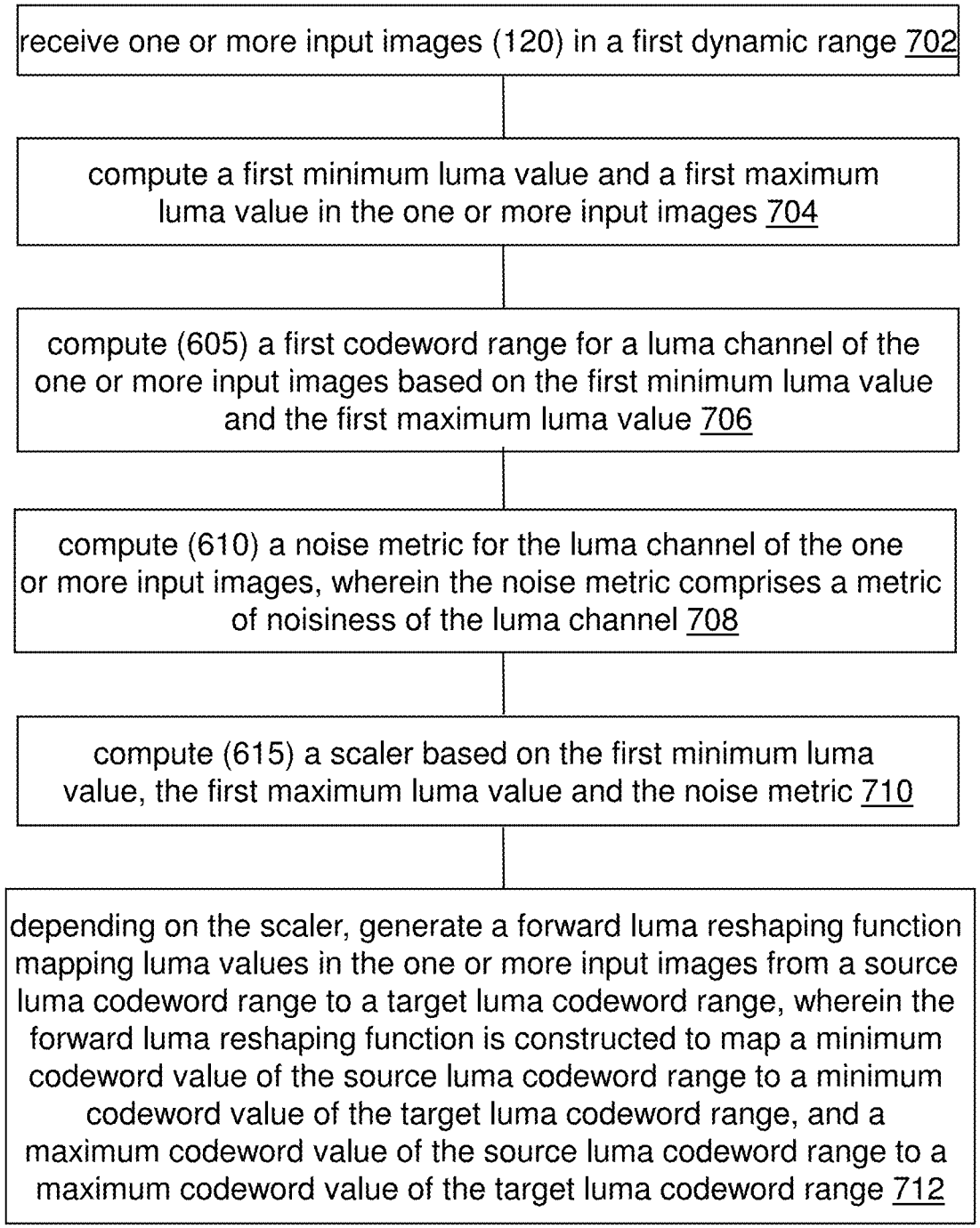
FIG. 7A and FIG. 7B illustrate an example method for generating a reshaping function.
Figure 7B:
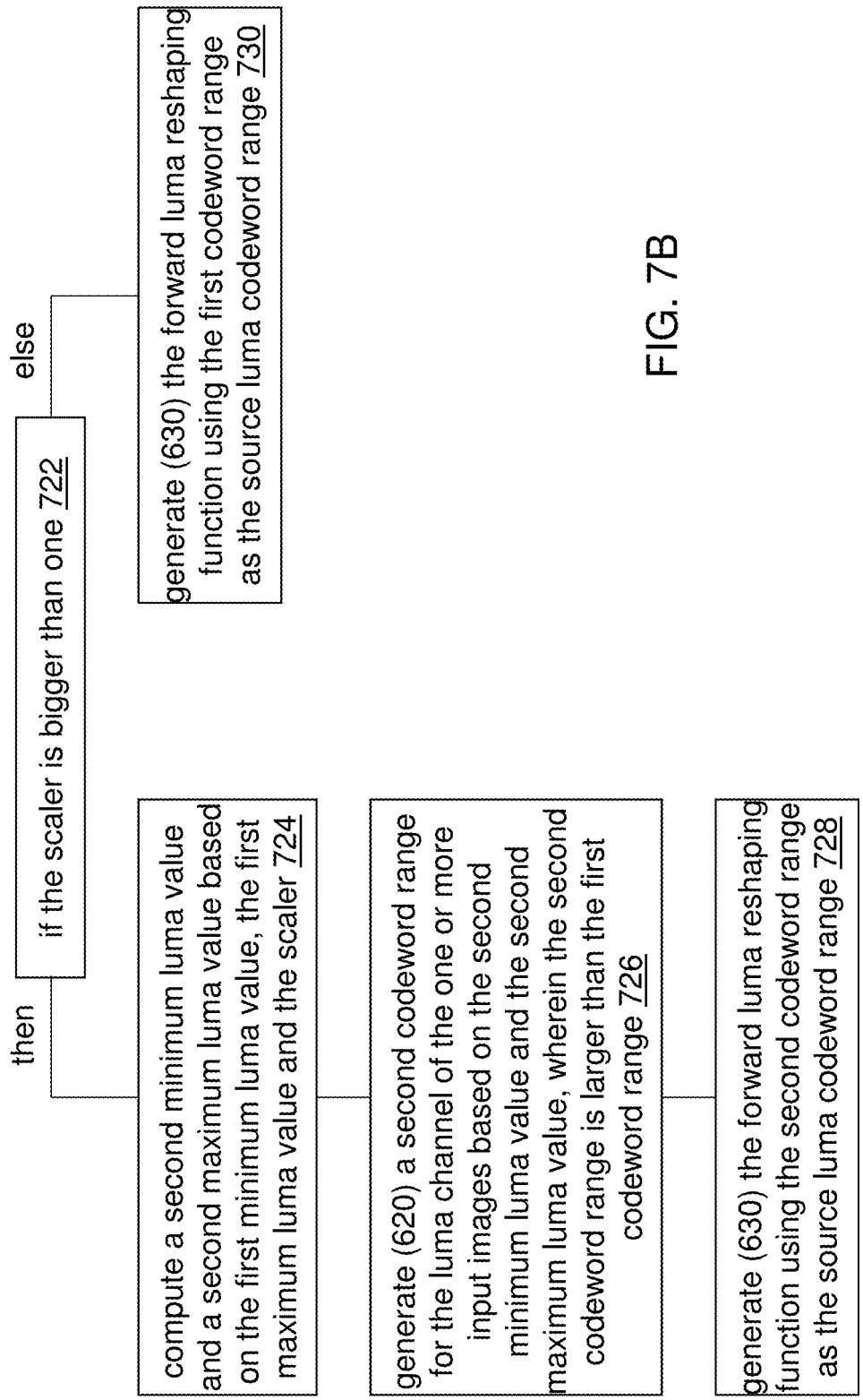

Various aspects of the present invention may be appreciated from the following enumerated example embodiments (EEEs):

EEE 1. A method for generating a reshaping function using one or more processors, the method comprising:
  receiving one or more input images (120) in a first dynamic range, as illustrated in block 702 of FIG. 7A;
  computing (605) a first codeword range for luma pixels in the one or more input images, as illustrated in block 704 of FIG. 7A;
  computing (610) a noise metric for the luma pixels in the one or more input images, as illustrated in block 706 of FIG. 7A;
  computing (615) a scaler to adjust the first codeword range based on the first codeword range and the noise metric, as illustrated in block 708 of FIG. 7A; and
  if the scaler is bigger than one:
    generating (620) a second codeword range for the luma pixels in the one or more input images based on the scaler and the first codeword range, wherein the second codeword range is larger than the first codeword range, as illustrated in block 722 of FIG. 7B; and
    generating (630) a forward luma reshaping function mapping luminance pixel values from the first dynamic range to a second dynamic range based on the second codeword range;
  else
    generating (625) the forward luma reshaping function based on the first codeword range.

EEE 2. The method of EEE 1, further comprising:
  if the scaler is bigger than one:
    generating a forward chroma reshaping function mapping chroma pixel values from the first dynamic range to the second dynamic range based on the second codeword range;
  else
    generating the forward chroma reshaping function based on the first codeword range.

EEE 3. The method of EEE 2, further comprising:
  applying the forward luma reshaping function and the forward chroma reshaping function to map the one or more input images in the first dynamic range to one or more reshaped images in the second dynamic range; and
  encoding the one or more reshaped images to generate a coded bitstream.

EEE 4. The method of any of EEEs 1-3, where computing the first codeword range comprises
  computing a first minimum luma pixel value and a first maximum luma pixel value in the one or more input images in the first dynamic range.

EEE 5. The method of EEE 4, wherein computing the scaler comprises computing an exponential mapping based on the first codeword range and the noise metric.

EEE 6. The method of EEE 5, wherein computing the scaler (M) comprises computing $$M = \max(\beta e^{-\alpha \delta}, 1.0),$$

wherein $\delta$ denotes a function of the first codeword range, $\beta$ denotes a function of the noise metric, and $\alpha$ is a function of the noise metric and a cut-off parameter C for which if $\delta \geq C$, then M=1.

EEE 7. The method of EEE 6, wherein $$\delta = \frac{\Delta_L^i}{2^{B_v}},$$

wherein $B_v$ denotes bit-depth resolution of the one or more input images, and $\Delta_L^i$ denotes a difference of the first minimum luma pixel value from the first maximum luma pixel value, $$\beta = \min\left(\max\left(\frac{1}{P^i}, P^i\right), 100\right) P^i > 0.$$

wherein $P^i$ denotes the noise metric, and $$\alpha = \frac{\ln(\beta)}{C}.$$

EEE 8. The method of any of EEEs 4-7, wherein generating the second codeword range comprises computing second luma pixel minimum $\tilde{v}_{L,min}^i$ and second luma pixel maximum $\tilde{v}_{L,max}^i$ values as:

$$\tilde{v}_{L,min}^i = \max(0, v_{L,avg}^i - M \times \Delta_{L,1}^i),$$

$$\tilde{v}_{L,max}^i = \max(2^{B_v} - 1, v_{L,avg}^i + M \times \Delta_{L,2}^i),$$

wherein $B_v$ denotes bit-depth resolution of the one or more input images, M denotes the scaler, and $$\Delta_{L,1}^i = v_{L,avg}^i - v_{L,min}^i,$$

$$\Delta_{L,2}^i = v_{L,max}^i - v_{L,avg}^i,$$

wherein $v_{L,min}^i$, $v_{L,max}^i$, and $v_{L,avg}^i$ denote the first minimum luma pixel value, the first maximum luma pixel value, and a first average luma pixel average value in the one or more input images.

EEE 9. The method of any of EEEs 1-8, where computing the noise metric comprises:
  normalizing pixel values in the one or more input images to [0, 1) to generate one or more normalized images;
  determining edge points in the one or more normalized images based on edge-detection operators and one or more thresholds; and
  determining the noise metric based on a percentage of the determined edge points over the total number of pixels in the one or more normalized images.

EEE 10. The method of EEE 9, wherein the edge-detection operators comprise the Sobel operators.

EEE 11. The method of EEE 9 or EEE 10, wherein computing the threshold for a j-th image in the one or more normalized images comprises computing $$Th_j = \max\left(0.001, \min\left(\frac{\Delta^i_{j,L,1}}{2^{B_v}}, \frac{\Delta^i_{j,L,2}}{2^{B_v}}\right)\right),$$

wherein $B_v$ denotes bit-depth resolution of the j-th image, $\Delta_{j,L,1}{}^i = v_{j,L,avg}{}^i - v_{j,L,min}{}^i,$ $\Delta_{j,L,2}{}^i = v_{j,L,max}{}^i - v_{j,L,avg}{}^i,$ wherein $v_{j,L,min}{}^i$, $v_{j,L,max}{}^i$, and $v_{j,L,avg}{}^i$ denote a minimum luma pixel value in the j-th image, a maximum luma pixel value in the j-th image, and an average luma pixel average value in the j-th image.

EEE 12. The method of any of EEEs 9-11, wherein determining the noise metric $P^i$ further comprises computing $P^i = \max(P_j{}^i),$ wherein $P_j{}^i$ denotes the percentage of edge points in the j-th normalized image in the one or more normalized images.

EEE 13. A non-transitory computer-readable storage medium having stored thereon computer-executable instructions for executing with one or more processors a method in accordance with any one of the EEEs 1-12.

EEE 14. An apparatus comprising a processor and configured to perform any one of the methods recited in EEEs 1-12.

EEE 15. A method for generating a reshaping function, the method comprising:
  receiving one or more input images (120) in a first dynamic range (as illustrated in 702 of FIG. 7A);
  computing a first minimum luma value and a first maximum luma value in the one or more input images (as illustrated in 704 of FIG. 7A);
  computing (605) a first codeword range for a luma channel of the one or more input images based on the first minimum luma value and the first maximum luma value (as illustrated in 706 of FIG. 7A);
  computing (610) a noise metric for the luma channel of the one or more input images, wherein the noise metric comprises a metric of noisiness of the luma channel (as illustrated in 708 of FIG. 7A);
  computing (615) a scaler based on the first minimum luma value, the first maximum luma value and the noise metric (as illustrated in 710 of FIG. 7A); and
  depending on the scaler, generating a forward luma reshaping function mapping luma values in the one or more input images from a source luma codeword range to a target luma codeword range, wherein the forward luma reshaping function is constructed to map a minimum codeword value of the source luma codeword range to a minimum codeword value of the target luma codeword range, and a maximum codeword value of the source luma codeword range to a maximum codeword value of the target luma codeword range (as illustrated in 712 of FIG. 7A), comprising:
    if the scaler is bigger than one (as illustrated in 722 of FIG. 7B):
      computing a second minimum luma value and a second maximum luma value based on the first minimum luma value, the first maximum luma value and the scaler (as illustrated in 724 of FIG. 7B);
      generating (620) a second codeword range for the luma channel of the one or more input images based on the second minimum luma value and the second maximum luma value, wherein the second codeword range is larger than the first codeword range (as illustrated in 726 of FIG. 7B); and
      generating (630) the forward luma reshaping function using the second codeword range as the source luma codeword range (as illustrated in 728 of FIG. 7B);
    else
      generating (625) the forward luma reshaping function using the first codeword range as the source luma codeword range (as illustrated in 730 of FIG. 7B).

Figure 8:
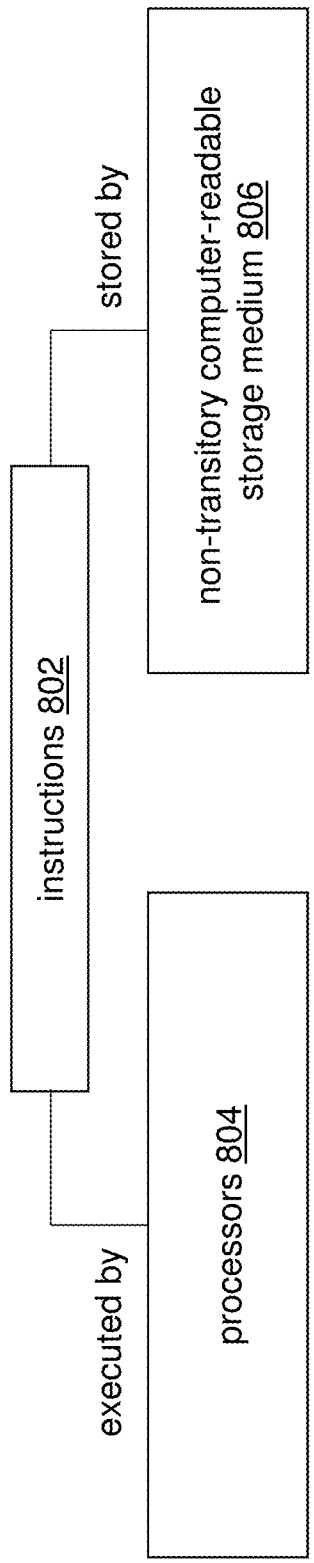
FIG. 8 illustrates example media, processors and instructions.

EEE 16. A non-transitory computer-readable storage medium (as illustrated in 806 of FIG. 8) having stored thereon computer-executable instructions (as illustrated in 802 of FIG. 8) for executing with one or more processors (as illustrated in 804 of FIG. 8) a method in accordance with EEE 15.

The invention claimed is:

1. A method for generating a reshaping function, the method comprising:
  receiving one or more input images (120) in a first dynamic range;
  computing a first minimum luma value and a first maximum luma value in the one or more input images;
  computing (605) a first codeword range for a luma channel of the one or more input images based on the first minimum luma value and the first maximum luma value;
  computing (610) a noise metric for the luma channel of the one or more input images, wherein the noise metric comprises a metric of noisiness of the luma channel;
  computing (615) a scaler based on the first minimum luma value, the first maximum luma value and the noise metric; and
  depending on the scaler, generating a forward luma reshaping function mapping luma values in the one or more input images from a source luma codeword range to a target luma codeword range, wherein the forward luma reshaping function is constructed to map a minimum codeword value of the source luma codeword range to a minimum codeword value of the target luma codeword range, and a maximum codeword value of the source luma codeword range to a maximum codeword value of the target luma codeword range, comprising:
    if the scaler is bigger than one:
      computing a second minimum luma value and a second maximum luma value based on the first minimum luma value, the first maximum luma value and the scaler;
      generating (620) a second codeword range for the luma channel of the one or more input images based on the second minimum luma value and the second maximum luma value, wherein the second codeword range is larger than the first codeword range; and
      generating (630) the forward luma reshaping function using the second codeword range as the source luma codeword range;
    else
      generating (625) the forward luma reshaping function using the first codeword range as the source luma codeword range.

2. The method of claim 1, further comprising:
depending on the scaler, generating, based on a minimum luma value, a maximum luma value, and the forward luma reshaping function, a forward chroma reshaping function mapping chroma values in the one or more input images from a source chroma codeword range to a target chroma codeword range, comprising:
if the scaler is bigger than one:
generating the forward chroma reshaping function using the second minimum luma value as the minimum luma value and the second maximum luma value as the maximum luma value;
else
generating the forward chroma reshaping function using the first minimum luma value as the minimum luma value and the first maximum luma value as the maximum luma value.

3. The method of claim 1, wherein computing the scaler comprises computing an exponential mapping based on the bit-depth resolution of the one or more input images, the first minimum luma value, the first maximum luma value and the noise metric.

4. The method of claim 1, wherein computing the scaler (M) comprises computing $$M = \max(\beta e^{-\alpha \delta}, 1.0),$$

wherein $\delta$ denotes a function of the bit-depth resolution of the one or more input images, the first minimum luma value and the first maximum luma value, $\beta$ denotes a function of the noise metric, and $\alpha$ is a function of the noise metric and a cut-off parameter C for which if $\delta \geq C$, then M=1.

5. The method of claim 4, wherein $$\delta = \frac{\Delta_L^i}{2^{B_v}},$$

wherein $B_v$ denotes the bit-depth resolution of the one or more input images, and $\Delta_L^i$ denotes a difference of the first minimum luma value from the first maximum luma value, $$\beta = \min\left(\max\left(\frac{1}{P^i}, P^i\right), 100\right) P^i > 0,$$

wherein $P^i$ denotes the noise metric, and $$\alpha = \frac{\ln(\beta)}{C}.$$

6. The method of claim 1, wherein the second minimum luma value $\tilde{v}_{L,min}^i$ and the second maximum luma value $\tilde{v}_{L,max}^i$ are computed as:

$$\tilde{v}_{L,min}^i = \max(0, v_{L,avg}^i - M \times \Delta_{L,1}^i),$$

$$\tilde{v}_{L,max}^i = \min(2^{B_v} - 1, v_{L,avg}^i + M \times \Delta_{L,2}^i),$$

wherein $B_v$ denotes the bit-depth resolution of the one or more input images, M denotes the scaler, and $$\Delta_{L,1}^i = v_{L,avg}^i - v_{L,min}^i,$$

$$\Delta_{L,2}^i = v_{L,max}^i - v_{L,avg}^i,$$

wherein $v_{L,min}^i$, $v_{L,max}^i$, and $v_{L,avg}^i$ denote the first minimum luma value, the first maximum luma value, and an average luma value in the one or more input images.

7. The method of claim 1, where computing the noise metric comprises:
normalizing luma values in the one or more input images to [0, 1) to generate one or more normalized images;
determining edge points in the one or more normalized images based on edge-detection operators and one or more thresholds; and
determining a percentage of the determined edge points over the total number of pixels in the one or more normalized images.

8. The method of claim 7, wherein the edge-detection operators comprise the Sobel operators.

9. The method of claim 7, wherein computing the threshold for a j-th image in the one or more normalized images comprises computing $$Th_j = \max\left(0.001, \min\left(\frac{\Delta_{j,L,1}^i}{2^{B_v}}, \frac{\Delta_{j,L,2}^i}{2^{B_v}}\right)\right),$$

wherein $B_v$ denotes the bit-depth resolution of the j-th image, $$\Delta_{j,L,1}^i = v_{j,L,avg}^i - v_{j,L,min}^i$$

$$\Delta_{j,L,2}^i = v_{j,L,max}^i - v_{j,L,avg}^i,$$

wherein $v_{j,L,min}^i$, $v_{j,L,max}^i$, and $v_{j,L,avg}^i$ denote a minimum luma value in the j-th image, a maximum luma value in the j-th image, and an average luma value in the j-th image.

10. The method of claim 7, wherein determining the noise metric $P^i$ further comprises computing $$P^i = \max(P_j^i),$$

wherein $P_j^i$ denotes the percentage of edge points in the j-th normalized image in the one or more normalized images.

11. The method of claim 2, further comprising:
applying the forward luma reshaping function and the forward chroma reshaping function to map the one or more input images in the first dynamic range to one or more reshaped images in a second dynamic range; and
encoding the one or more reshaped images to generate a coded bitstream.

12. A non-transitory computer-readable storage medium having stored thereon computer-executable instructions for executing with one or more processors a method in accordance with claim 1.

13. An apparatus comprising a processor and configured to perform the method recited in claim 1.

* * * * *